(12) United States Patent
Inagaki

(10) Patent No.: US 8,960,217 B2
(45) Date of Patent: Feb. 24, 2015

(54) PILOT RELAY

(75) Inventor: Yohsuke Inagaki, Tokyo (JP)

(73) Assignee: Azbil Corporation, Tokyo (JP)

( * ) Notice: Subject to any disclaimer, the term of this patent is extended or adjusted under 35 U.S.C. 154(b) by 349 days.

(21) Appl. No.: 13/431,234

(22) Filed: Mar. 27, 2012

(65) Prior Publication Data

US 2012/0247594 A1  Oct. 4, 2012

(30) Foreign Application Priority Data

Mar. 30, 2011 (JP) ................... 2011-074860

(51) Int. Cl.
F15B 5/00 (2006.01)
F16K 11/07 (2006.01)
F15B 13/043 (2006.01)
F15B 13/04 (2006.01)

(52) U.S. Cl.
CPC ............. *F16K 11/0716* (2013.01); *F15B 5/006* (2013.01); *F15B 13/0433* (2013.01); *F15B 13/0405* (2013.01)
USPC ................... 137/85; 137/596.18; 137/625.66; 137/625.68; 137/627.5

(58) Field of Classification Search
USPC ............. 137/625.63, 625.66, 625.68, 625.69, 137/596.17, 596.18, 596.2, 863, 614.14, 137/627.5, 628, 85
See application file for complete search history.

(56) References Cited

U.S. PATENT DOCUMENTS

| | | | | |
|---|---|---|---|---|
| 3,222,995 A | * | 12/1965 | Reed | 137/596.18 |
| 3,252,471 A | * | 5/1966 | Olson | 137/627.5 |
| 3,277,923 A | * | 10/1966 | Hogel | 137/627.5 |
| 3,384,122 A | * | 5/1968 | Harpman | 137/625.64 |
| 3,528,455 A | * | 9/1970 | Kreuter et al. | 137/627.5 |
| 3,548,879 A | * | 12/1970 | Wilde | 137/625.66 |
| 3,565,094 A | * | 2/1971 | Pisoni et al. | 137/596.18 |
| 3,592,227 A | * | 7/1971 | Rivolier | 137/596.14 |
| 3,794,075 A | * | 2/1974 | Stoll et al. | 137/625.66 |
| 4,021,016 A | * | 5/1977 | Hart | 137/625.69 |
| 4,111,230 A | * | 9/1978 | Stampfli | 137/625.66 |
| 4,883,089 A | * | 11/1989 | Tamamori | 137/596.18 |
| 5,146,952 A | * | 9/1992 | Tamamori | 137/627.5 |

FOREIGN PATENT DOCUMENTS

JP  2005-282718 A  10/2005
JP  2008-95847 A   4/2008

* cited by examiner

*Primary Examiner* — Craig Schneider
*Assistant Examiner* — Craig J Price
(74) *Attorney, Agent, or Firm* — Troutman Sanders LLP

(57) ABSTRACT

A spool is provided with a first discharge air duct connecting the first opening to the first discharge air chamber, and a second discharge air duct connecting the second opening to the second discharge air chamber, where the first discharge air duct and the second discharge air duct are divided by a non-duct part. A first output air pressure chamber is adjacent to a first discharge air chamber with a first diaphragm interposed therebetween, the first discharge air chamber is adjacent to a bias chamber with a second diaphragm interposed therebetween, the bias chamber is adjacent to an input air pressure chamber with a third diaphragm interposed therebetween, the input air pressure chamber is adjacent to a second discharge air chamber with a fourth diaphragm interposed therebetween, and the second discharge air chamber is adjacent to a second output air pressure chamber with a fifth diaphragm interposed therebetween.

2 Claims, 4 Drawing Sheets

PILOT RELAY

CROSS REFERENCE TO RELATED APPLICATIONS

The present application claims priority under 35 U.S.C. §119 to Japanese Patent Application No. 2011-074860, filed Mar. 30, 2011, which is incorporated herein by reference.

FIELD OF TECHNOLOGY

The present invention relates to a pilot relay that is used in a positioner, or the like, for controlling the degree of opening of a regulator valve (a valve) of a pneumatically actuated type.

BACKGROUND

Conventionally, positioners have been used in controlling the driving of valves and in controlling the driving of process automation and other common industrial equipment, enabling the control of the degree of opening of a valve through attaching the positioner to the valve.

FIG. 3 illustrates the structure of the critical portions of a positioner that enables the control of the degree of opening of a valve. In this diagram, 100 is a positioner, where this positioner 100 is structured from an electro-pneumatic converting portion 101 for converting to a pneumatic signal Pn a valve opening signal that is sent in an electric signal from a higher-level controller 200, and a pilot relay (pressure signal amplifying device) 102 for amplifying the air pressure signal (input air pressure) Pn, converted by this electro-pneumatic converting portion 101, and outputting it to a valve 300 as an output air pressure signal (output air pressure) Po.

The pilot relay 102 used in such a positioner 100 may be of the single-action type, wherein a single output air pressure Po is outputted for a single input air pressure Pn, or a double-action type, wherein two output air pressures Po1 and Po2 are outputted in relation to a single input air pressure Pn. The double-action pilot relay 102 has two output ports, where the output air pressure Po1 of the first output port is higher than the output air pressure Po2 of the second output port when the valve 300 is operated in the forward direction, and the output air pressure Po2 of the second port is higher than the output air pressure Po1 of the first port when operated in the reverse direction.

FIG. 4 illustrates a structure of the double-action pilot relay disclosed in Japanese Unexamined Patent Application Publication 2005-282718 ("JP '718"). In this figure, 401 is a housing, where an input air pressure chamber 402, a first supply air pressure chamber 403, a second supply air pressure chamber 404, a first output air pressure chamber 405, a second output air pressure chamber 406, a discharge air chamber 407, and a bias chamber 408 are provided within the housing 401.

Moreover, a diaphragm 409 that is displaced by the input air pressure (the nozzle back pressure) Pn that is directed into the input air pressure chamber 402 is provided within the housing 401, where a spool (a movable body) 410 is provided on the diaphragm 409 so as to be able to move in the direction of the arrow A and the direction of the arrow B. The spool 410 has a first opening 410a that is located at the first output air pressure chamber 405, a second opening 410b that is located at the second output air pressure chamber 406, and a discharge air duct 410c for connecting the first opening 410a and the second opening 410b to the discharge air chamber 407.

A ring wall 411 is formed as a valve seat within the housing between the first supply air pressure chamber 403 and the first output air pressure chamber 405. This ring wall 411 fulfills the role as a first dividing wall for partitioning between the first supply air pressure chamber 403 and the first output air pressure chamber 405. A ring wall 412 is formed within the housing between the second supply air pressure chamber 404 and the second output air pressure chamber 406. This ring wall 412, as a valve seat fulfills the role as a second dividing wall for partitioning between the second supply air pressure chamber 404 and the second output air pressure chamber 406.

Moreover, a first poppet valve 413 is provided so as to be able to slide to the left and right through a center hole 411a in the ring wall 411, between the first supply air pressure chamber 403 and the first output air pressure chamber 405. The first poppet valve 413 has, integrally, a discharge air valve 413a for opening and closing the first opening 410a of the spool 410, and a supply air valve 413b for opening and closing the center hole (a first connecting hole) 411a in the ring wall 411.

A second poppet valve 414 is provided so as to be able to slide to the left and right through a center hole 412a in the ring wall 412, between the second supply air pressure chamber 404 and the second output air pressure chamber 406. The second poppet valve 414 has, integrally, a discharge air valve 414a for opening and closing the second opening 410b of the spool 410, and a supply air valve 414b for opening and closing the center hole (a second connecting hole) 412a in the ring wall 412.

Moreover, the first supply air pressure chamber 403 is provided with a first spring 415 for biasing the first poppet valve 413 in the direction of the arrow B, that is, in the direction wherein the supply air valve 413b closes the first connecting hole 411a. The second supply air pressure chamber 404 is provided with a second spring 416 for biasing the second poppet valve 414 in the direction of the arrow A, that is, in the direction wherein the supply air valve 414b closes the second connecting hole 412a.

In this double-action pilot relay, the supply air pressure Ps is supplied through the air supplying pipe 417 to the first supply air pressure chamber 403 and the second supply air pressure chamber 404, and the input air pressure Pn is guided through the nozzle back pressure injecting pipe 418 into the input air pressure chamber 402. Moreover, the output air pressure Po1 is outputted to the valve 300 through the first air outputting pipe 419 from the first output air pressure chamber 405 and the output air pressure Pot is outputted to the valve 300 through the second air outputting pipe 420 from the second output air pressure chamber 406. Note that a bias chamber 408 is formed between the diaphragms 409 and 421, support on the spool 410, where a supply air pressure Ps is supplied through the air supplying pipe 417 to this bias chamber 408. Additionally, the discharge air chamber 407 is connected to atmosphere.

In this double-action pilot relay, when the input air pressure Pn is decreased, the diaphragm 409 moves to the side of the arrow A, and, concomitantly, the spool 410 that is supported on the diaphragm 409 moves to the side of the arrow A. At this time, the spool 410, through this movement, presses the first poppet valve 413 downward against the biasing force of the first spring 415, and, as a result, the supply air valve 413b of the first poppet valve 413 opens the first connecting hole 411b. At this time, the first opening 410a of the spool 410 is closed by the discharge air valve 413a of the first poppet valve 413. On the other hand, the second poppet valve 414 is pushed upward by the biasing force of the second spring 416, and, accordingly, the supply air valve 414b of the second poppet valve 414 closes the second connecting hole 412b. At this time, the second opening 410b of the spool 410 is opened by the discharge air valve 414a of the second poppet valve 414.

As a result, the air that is supplied to the first supply air pressure chamber 403 through the air supplying pipe 417 is introduced into the first output air pressure chamber 405 through the first connecting hole 411b, to be supplied to the valve 300 through the first air outputting pipe 419. On the other hand, after the air from the valve 300 has returned to the second output air pressure chamber 406 through the second air outputting pipe 420, it enters into the discharge air duct 410c from the second opening 410b of the spool 410, to be discharged into the discharge air chamber 407.

On the other hand, when the input air pressure Pn is increased, the diaphragm 409 moves to the side of the arrow B, and, concomitantly, the spool 410 that is supported on the diaphragm 409 moves to the side of the arrow B. At this time, the spool 410, through this movement, presses the second poppet valve 414 downward against the biasing force of the second spring 416, and, as a result, the supply air valve 414b of the second poppet valve 414 opens the second connecting hole 412a. At this time, the second opening 410b of the spool 410 is closed by the discharge air valve 414a of the second poppet valve 414. On the other hand, the first poppet valve 413 is pushed upward by the biasing force of the first spring 415, and, accordingly, the supply air valve 413b of the first poppet valve 413 closes the first connecting hole 411a. At this time, the first opening 410a of the spool 410 is opened by the discharge air valve 413a of the first poppet valve 413.

As a result, the air that is supplied to the second supply air pressure chamber 404 through the air supplying pipe 417 is introduced into the second output air pressure chamber 406 through the second connecting hole 412a, to be supplied to the valve 300 through the second air outputting pipe 420. On the other hand, after the air from the valve 300 has returned to the first output air pressure chamber 405 through the first air outputting pipe 419, it enters into the discharge air duct 410c from the first opening 410a of the spool 410, to be discharged into the discharge air chamber 407.

In this way, the spool 410 and the pair of poppet valves 412 and 413 are actuated by the input air pressure Pn that is directed into the input air pressure chamber 402, where the action thereof causes the amplified output air pressures Po1 and Po2 to be outputted to the valve 300 through the air outputting pipes 419 and 420. In this case, the output air pressure Po1 can be adjusted through adjusting the pressure of the input air pressure Pn in the decreasing direction when operating the valve 300 in the forward direction, and the output air pressure Po2 can be adjusted through adjusting the pressure of the input air pressure Pn in the increasing direction when operating the valve 300 in the reverse direction.

However, with the pilot relay set forth in the aforementioned JP '718, the first output air pressure chamber 405 is adjacent to the input air pressure chamber 402, and the first output air pressure chamber 405 and the input air pressure chamber 402 are sealed together through an O-ring 422, so there is a problem in that there is a large hysteresis in the input/output characteristics.

Given this, in order to solve the problem set forth above, one may consider the use of a diaphragm instead of the O-ring 422, but because the magnitude relationships between the pressures in the input air pressure chamber 402 and the first output air pressure chamber 405 change frequently, that is, go to Po1<Pn and Po1<Pn, in what is known as pressure inversions, there would be violent changes between positive and negative pressure on the diaphragm, which would cause a reduction in the durability of the diaphragm.

Moreover, in the pilot relay disclosed in the aforementioned JP '718, a discharge air duct 410c is formed passing through the axis of the spool 410, and thus the spool 410 cannot be assembled through an easy method, such as screwing together, using a split structure, so manufacturability has been poor.

Note that Japanese Unexamined Patent Application Publication 2008-95847 ("JP '847") discloses an example wherein the changes in pressure are violent, so that in order to suppress the inversion of pressure that acts on the diaphragm, the output air pressure chamber, the input air pressure chamber (the nozzle back pressure chamber), and the feedback chamber are not disposed so as to be mutually adjacent, where a bias chamber, a discharge air chamber, and an atmosphere chamber are disposed therebetween. However, in the structure disclosed in JP '847, at this time, the spool has only one discharge air duct that penetrates therethrough, and the spool cannot use a divided structure, and thus there is a problem remaining with manufacturability.

Moreover, in the structure set forth in JP '847, the number of chambers required within the casing is increased tremendously, requiring 11 chambers. When the number of chambers is increased, there is a problem in that there is an increase in the number of structural components, such as the number of diaphragms, as well, causing the pilot relay to become bulky and leading to problems such as increasing the size and driving up the costs of the positioners that use this technology.

The present invention was created in order to solve such problems, and the object thereof is to provide a pilot relay that is able to improve the durability of the diaphragm, and able to increase the manufacturability of the spool (the movable body) through a divided structure.

SUMMARY

In order to attain the object set forth above, examples of the present invention are a pilot relay having an input air pressure chamber, a first supply air pressure chamber, a second supply air pressure chamber, a first output air pressure chamber, a second output air pressure chamber, a first discharge air chamber, a second discharge air chamber, and a bias chamber formed within a housing; a diaphragm for dislocation by input air pressure that is directed into the input air pressure chamber; a moveable body that has a first opening located in the first output air pressure chamber, a second opening located in the second output air pressure chamber, a first discharge air duct that connects this first opening to the first discharge air chamber, a second discharge air duct that connects this second opening to the second discharge air chamber, and that is supported on the diaphragm to move within the housing; a first poppet valve that is provided so as to be able to move through a first connecting hole that is formed in a first dividing wall that divides the first supply air pressure chamber and the first output air pressure chamber, and that has, integrally, a first discharge air valve for opening and closing a first opening of the moveable body and a first supply air valve for opening and closing the first connecting hole; a second poppet valve that is provided so as to be able to move through a second connecting hole that is formed in a second dividing wall that divides the second supply air pressure chamber and the second output air pressure chamber, and that has, integrally, a second discharge air valve for opening and closing a second opening of the moveable body and a second supply air valve for opening and closing the second connecting hole; a first spring member for biasing the first poppet valve in the direction wherein the first supply air valve closes the first connecting hole; and a second spring member for biasing the second poppet valve in the direction wherein the second supply air valve closes the second connecting hole; wherein: the input air pressure chamber is adjacent to neither the first output air pressure chamber nor the second output air pressure chamber.

In the examples of the present invention, a first discharge air duct that connects, to a first discharge air chamber, a first opening that is located in a first output air pressure chamber, and a second discharge air duct that connects, to a second discharge air chamber, a second opening that is located in a second output air pressure chamber, are provided in a movable body (a spool). Doing so provides a non-duct part, wherein the first discharge air duct and the second discharge air duct are divided in the center of the movable body, where the movable body is divided at this non-duct part, making it possible to assemble the movable body using an easy method, such as screwing.

Moreover, in this invention, the input air pressure chamber is adjacent to neither the first output air pressure chamber nor the second output air pressure chamber, so there is no diaphragm that divides between the input air pressure chamber and the output air pressure chambers. This eliminates the violent changes between positive and negative pressure, enabling an improvement in the durability of the diaphragm.

For example, as an example of the present invention, a first discharge air chamber is caused to be adjacent to a first output air pressure chamber with a first diaphragm interposed therebetween, and caused to be adjacent to a bias chamber with a second diaphragm interposed therebetween, an input air pressure chamber is caused to be adjacent to the bias chamber with a third diaphragm interposed therebetween, and caused to be adjacent to a second discharge air chamber with a fourth diaphragm interposed therebetween, and the second discharge air chamber is caused to be adjacent to a second output air pressure chamber, with a fifth diaphragm interposed therebetween. In this case, the first output air pressure chamber is adjacent to the first discharge air chamber with a first diaphragm interposed therebetween, and the first discharge air chamber is adjacent to the bias chamber with a second diaphragm interposed therebetween. Moreover, the input air pressure chamber is adjacent to the bias chamber with a third diaphragm interposed therebetween, and the second output air pressure chamber is adjacent to the second discharge air chamber with a fifth diaphragm interposed therebetween.

For example, as another example of the present invention, a bias chamber is caused to be adjacent to a first output air pressure chamber with a first diaphragm interposed therebetween, and caused to be adjacent to a first discharge air chamber with a second diaphragm interposed therebetween, an input air pressure chamber is caused to be adjacent to the first discharge air chamber with a third diaphragm interposed therebetween, and caused to be adjacent to a second discharge air chamber with a fourth diaphragm interposed therebetween, and the second discharge air chamber is caused to be adjacent to a second output air pressure chamber, with a fifth diaphragm interposed therebetween. In this case, the first output air pressure chamber is adjacent to the bias chamber with the first diaphragm interposed therebetween, and the input air pressure chamber is adjacent to the first discharge air chamber with a third diaphragm interposed therebetween. Moreover, the input air pressure chamber is adjacent to the second discharge air chamber with a fourth diaphragm interposed therebetween, and the second output air pressure chamber is adjacent to the second discharge air chamber with a fifth diaphragm interposed therebetween.

In the example a first discharge air duct that connects, to a first discharge air chamber, a first opening that is located in a first output air pressure chamber, and a second discharge air duct that connects, to a second discharge air chamber, a second opening that is located in a second output air pressure chamber, are provided in a movable body (a spool), and thus a non-duct part, wherein the first discharge air duct and the second discharge air duct are divided, is provided in the center of the movable body, where the movable body is divided at this non-duct part, making it possible to assemble the movable body using an easy method, such as screwing, enabling an improvement in the manufacturability.

Moreover, in this invention, the input air pressure chamber is adjacent to neither the first output air pressure chamber nor the second output air pressure chamber, so there is no diaphragm that divides between the input air pressure chamber and the output air pressure chambers, eliminating the violent changes between positive and negative pressure, enabling an improvement in the durability of the diaphragm.

DETAILED DESCRIPTION

A examples according to the present invention are explained below in detail, based on the drawings.

Figure 1:
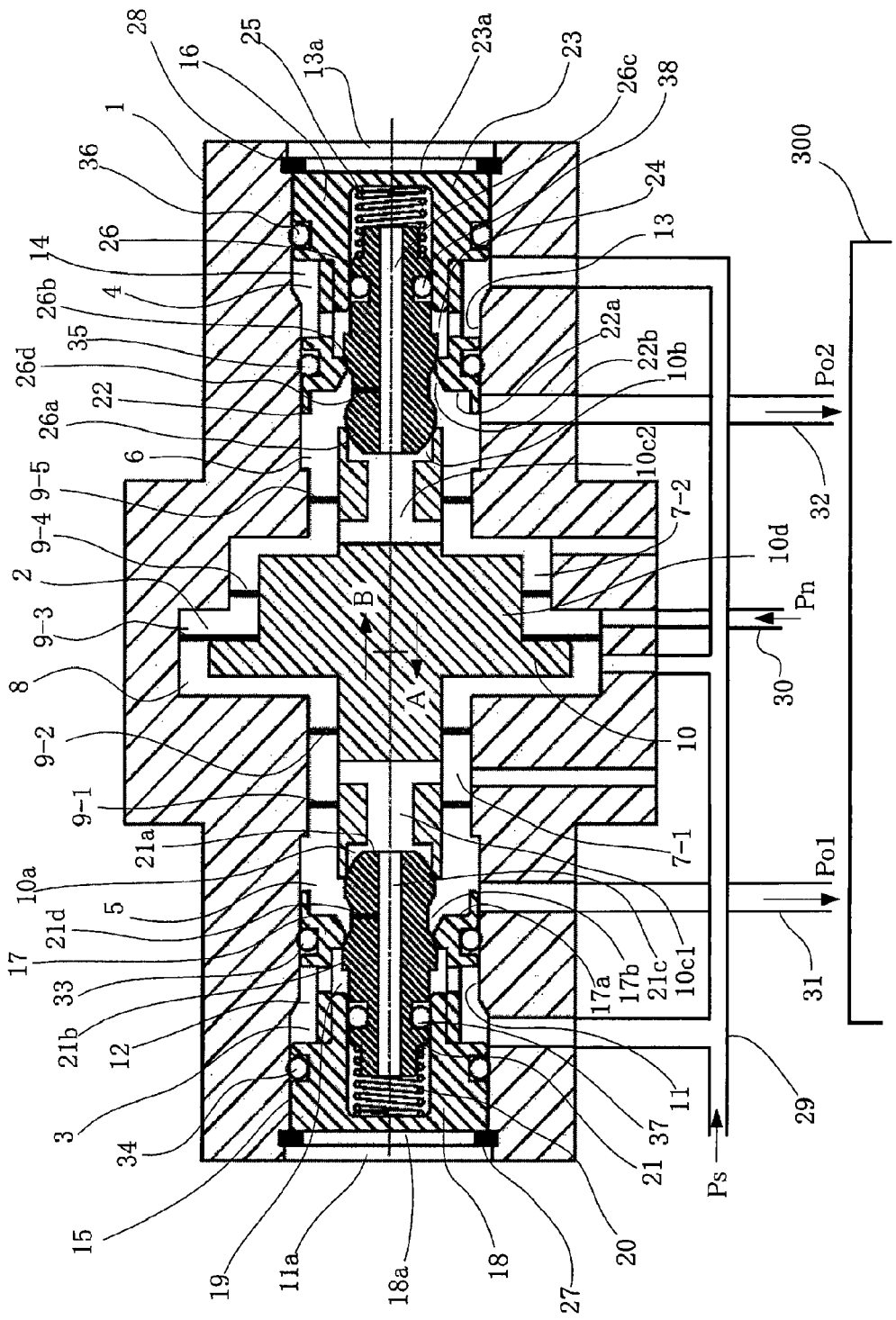
FIG. 1 is a diagram illustrating a structure of an example of a pilot relay (a double-action pilot relay) according to the present invention.

FIG. 1 is a diagram illustrating the structure of an example of a pilot relay (a double-action pilot relay) according to the present invention.

In FIG. 1 is a housing, where an input air pressure chamber 2, a first supply air pressure chamber 3, a second supply air pressure chamber 4, a first output air pressure chamber 5, a second output air pressure chamber 6, a first discharge air chamber 7-1, a second discharge air chamber 7-2, and a bias chamber 8 are provided within the housing 1.

In this housing 1, the first discharge air chamber 7-1 is adjacent to the first output air pressure chamber 5 with a first diaphragm 9-1 interposed therebetween, and adjacent to the bias chamber 8 with a second diaphragm 9-2 interposed therebetween. Moreover, the input air pressure chamber 2 is adjacent to the bias chamber 8 with a third diaphragm 9-3 interposed therebetween, and adjacent to a second discharge air chamber 7-2 with a fourth diaphragm 9-4 interposed therebetween. Moreover, the second discharge air chamber 7-2 is adjacent to the second output air pressure chamber 6 with a fifth diaphragm 9-5 interposed therebetween. The first through fifth diaphragms 9-1 through 9-5 are provided between the housing 1 and a spool (movable body) 10, where the spool 10 is supported by these first through fifth diaphragms 9-1 through 9-5 so as to be able to move in the direction of the arrow A and in the direction of the arrow B.

The spool 10 has a first opening 10a that is located at the first output air pressure chamber 5, a second opening 10b that is located at the second output air pressure chamber 6, a first discharge air duct 10c1 for connecting a first opening 10a to the first discharge air chamber 7-1, and a second discharge air duct 10c2 for connecting a second opening 10b to the second discharge air chamber 7-2. In the spool 10, the first discharge air duct 10c1 and the second discharge air duct 10c2 are divided by a non-duct part 10d.

Moreover, at the end portion on one side of the housing 1, a duct 11 wherein the opening portion 11a thereof faces the outside of the housing 1 is provided as a first poppet valve assembly installing portion 12, and at the end portion on the other side of the housing 1, a duct 13 wherein the opening portion 13a thereof faces the outside of the housing 1 is provided as a second poppet valve assembly installing portion 14.

A first poppet valve assembly 15 is installed slidably, along the inside wall face of the duct 11, from the opening portion 11a of the duct 11 that faces the outside of the housing 1, into the first poppet valve assembly installing portion 12, where the space remaining at the bottom portion of the duct 11 is defined as the first output air pressure chamber 5. A second poppet valve assembly 16 is installed slidably, along the inside wall face of the duct 13, from the opening portion 13a of the duct 13 that faces the outside of the housing 1, into the second poppet valve assembly installing portion 14, where the space remaining at the bottom portion of the duct 13 is defined as the second output air pressure chamber 6.

The first poppet valve assembly 15 is a divided structure of a cylindrical pipe seat portion 17 and a cylindrical column seat retaining portion 18, having the seat portion 17 attached removably to the front face thereof, where an interior space 19 is formed between the seat portion 17 and the seat retaining portion 18. A first connecting hole 17b for connecting between the interior space 19 and the first output air pressure chamber 5 is formed in the top face 17a of the seat portion 17. This top face 17a of the seat portion 17 fulfills the role as a first dividing wall for partitioning between the first supply air pressure chamber 3 and the first output air pressure chamber 5.

A first spring 20 is contained in the interior space 19 between the seat portion 17 and the seat retaining portion 18, where the first poppet valve 21 is held between the seat portion 17 and the seat retaining portion 18 in a state wherein the first spring 20 is stressed. The interior space 19 is connected to the first supply air pressure chamber 3. The first poppet valve 21 has a discharge air valve 21a at the tip end portion thereof, and a supply air valve 21b to the rear of the discharge air valve 21a. Moreover, the first poppet valve 21 has a through hole 21c that passes through the axis thereof.

In this held state, the first poppet valve 21 penetrates through the first connecting hole 17b that is formed in the seat portion 17, and is biased by the first spring 20 so as to be able to move to the left and right. Moreover, the supply air valve 21b is biased in the direction so as to close the first connecting hole 17b, and the discharge air valve 21a protrudes from the first connecting hole 17b. Note that a fine connecting duct 21d that connects to the through hole 21c that is formed on the interior of the first poppet valve 21 is formed between the discharge air valve 21a and the supply air valve 17b of the first poppet valve 21. Because in this first poppet valve assembly 15 the seat portion 17 and the seat retaining portion 18 have a divided structure, the assembly operation for the first spring 20 and the first poppet valve 21 is easy.

The second poppet valve assembly 16 is also structured identically to the first poppet valve assembly 15. That is, the second poppet valve assembly 16 is a divided structure of a cylindrical pipe seat portion 22 and a cylindrical column seat retaining portion 23, having the seat portion 22 attached removably to the front face thereof, where an interior space 24 is formed between the seat portion 22 and the seat retaining portion 23. A second connecting hole 22b for connecting between the interior space 24 and the second output air pressure chamber 6 is formed in the top face 22a of the seat portion 22. This top face 22a of the seat portion 22 fulfills the role as a second dividing wall for partitioning between the second supply air pressure chamber 4 and the second output air pressure chamber 6.

A second spring 25 is contained in the interior space 24 between the seat portion 22 and the seat retaining portion 23, where the second poppet valve 26 is held between the seat portion 22 and the seat retaining portion 23 in a state wherein the second spring 25 is stressed. The interior space 24 is connected to the second supply air pressure chamber 4. The second poppet valve 26 has a discharge air valve 26a at the tip end portion thereof, and a supply air valve 26b to the rear of the discharge air valve 26a. Moreover, the second poppet valve 26 has a through hole 26c that passes through the axis thereof.

In this held state, the second poppet valve 26 penetrates through the second connecting hole 22b that is formed in the seat portion 22, and is biased by the second spring 25 so as to be able to move to the left and right. Moreover, the supply air valve 26b is biased in the direction so as to close the second connecting hole 22b, and the discharge air valve 26a protrudes from the second connecting hole 22b. Note that a fine connecting duct 26d that connects to the through hole 26c that is formed on the interior of the second poppet valve 26 is formed between the discharge air valve 26a and the supply air valve 26b of the second poppet valve 26. Because in this second poppet valve assembly 26 as well the seat portion 22 and the seat retaining portion 23 have a divided structure, the assembly operation for the second spring 25 and the second poppet valve 26 is easy.

After attaching the first poppet valve assembly 15 to the first poppet valve assembly installing portion 12, that is, after the first poppet valve assembly 15 is pushed into the duct 11 from the opening portion 11a that faces the outside of the housing 1, in relation to this first poppet valve assembly 15, a ring-shaped stopper plate 27 is attached to the opening portion 11a of the duct 11. That is, the ring surface of the stopper plate 27 is put into facial contact with the surface of the first poppet valve assembly 15 that faces the outside of the housing 1 (the bottom face 18a of the seat retaining portion 18), to control the location of the first poppet valve assembly 15 in the first poppet valve assembly installing portion 12.

Similarly, after attaching the second poppet valve assembly 16 to the second poppet valve assembly installing portion 14, that is, after the second poppet valve assembly 16 is pushed into the duct 13 from the opening portion 13a that faces the outside of the housing 1, in relation to this second poppet valve assembly 16 as well, a ring-shaped stopper plate 28 is attached to the opening portion 13a of the duct 13. That is, the ring surface of the stopper plate 28 is put into facial contact with the surface of the second poppet valve assembly 16 that faces the outside of the housing 2 (the bottom face 23a of the seat retaining portion 23), to control the location of the second poppet valve assembly 16 in the second poppet valve assembly installing portion 14.

In this double-action pilot relay, the supply air pressure Ps is supplied through the air supplying pipe 29 to the first supply air pressure chamber 3, the second supply air pressure chamber 4, and the bias chamber 8, and the input air pressure Pn is guided through the nozzle back pressure injecting pipe 30 into the input air pressure chamber 2. Moreover, the output air pressure Po1 is outputted to the valve 300 through the first air outputting pipe 31 from the first output air pressure chamber 5 and the output air pressure Po2 is outputted to the valve 300 through the second air outputting pipe 32 from the second output air pressure chamber 6.

Note that the first discharge air chamber 7-1 and the second discharge air chamber 7-2 are connected to atmosphere, and O-rings 33 and 34 are provided between the housing 1 and the seat portion 17 and the seat retaining portion 18 of the first poppet valve assembly 15. Additionally, O-rings 35 and 36 are provided between the housing 1 and the seat portion 22 and the seat retaining portion 23 of the second poppet valve assembly 16. Moreover, in the first poppet valve assembly 15, an O-ring 37 is installed between the first poppet valve 21 and the seat retaining portion 18, and in the second poppet valve assembly 16, an O-ring 38 is installed between the second poppet valve 26 and the seat retaining portion 23.

In this double-action pilot relay, when the input air pressure Pn is increased, the diaphragms 9-1 through 9-5 move to the side of the arrow A, and, concomitant therewith, the spool 10 that is supported on the diaphragms 9-1 through 9-5 moves to the side of the arrow A. At this time, the spool 10, through this movement, presses the first poppet valve 21 downward against the biasing force of the first spring 20, and, as a result, the supply air valve 21b of the first poppet valve 21 opens the first connecting hole 17b. At this time, the first opening 10a of the spool 10 is closed by the discharge air valve 21a of the first poppet valve 21. On the other hand, the second poppet valve 26 is pushed upward by the biasing force of the second spring 25, and, accordingly, the supply air valve 26b of the second poppet valve 26 closes the second connecting hole 22b. At this time, the second opening 10b of the spool 10 is opened by the discharge air valve 26a of the second poppet valve 26.

As a result, the air that is supplied to the first supply air pressure chamber 3 through the air supplying pipe 29 enters into the interior space 19 in the first poppet valve assembly 15, and is introduced into the first output air pressure chamber 5 through the first connecting hole 17b, to be supplied to the valve 300 through the first air outputting pipe 31. On the other hand, after the air from the valve 300 has returned to the second output air pressure chamber 6 through the second air outputting pipe 32, it enters into the second discharge air duct 10c2 from the second opening 10b of the spool 10, to be discharged into the second discharge air chamber 7-2.

On the other hand, when the input air pressure Pn is decreased, the diaphragms 9-1 through 9-5 move to the side of the arrow B, and, concomitantly, the spool 10 that is supported on the diaphragm 9-1 through 9-5 move to the side of the arrow B. At this time, the spool 10, through this movement, presses the second poppet valve 26 downward against the biasing force of the second spring 25, and, as a result, the supply air valve 26b of the second poppet valve 26 opens the second connecting hole 22b. At this time, the second opening 10b of the spool 10 is closed by the discharge air valve 26a of the second poppet valve 26. On the other hand, the first poppet valve 21 is pushed upward by the biasing force of the first spring 20, and, accordingly, the supply air valve 21b of the first poppet valve 21 closes the first connecting hole 17b. At this time, the first opening 10a of the spool 10 is opened by the discharge air valve 21a of the first poppet valve 21.

As a result, the air that is supplied to the second supply air pressure chamber 4 through the air supplying pipe 29 enters into the interior space 24 in the second poppet valve assembly 16, and is introduced into the second output air pressure chamber 6 through the second connecting hole 22b, to be supplied to the valve 300 through the second air outputting pipe 32. On the other hand, after the air from the valve 300 has returned to the first output air pressure chamber 5 through the first air outputting pipe 31, it enters into the first discharge air duct 10c1 from the first opening 10a of the spool 10, to be discharged into the first discharge air chamber 7-1.

In this way, the spool 10 and the pair of poppet valves 21 and 26 are actuated by the input air pressure Pn that is directed into the input air pressure chamber 2, where the action thereof causes the amplified output air pressures Po1 and Po2 to be outputted to the valve 300 through the air outputting pipes 31 and 32. In this case, the output air pressure Po1 can be adjusted through adjusting the pressure of the input air pressure Pn in the increasing direction when operating the valve 300 in the forward direction, and the output air pressure Po2 can be adjusted through adjusting the pressure of the input air pressure Pn in the decreasing direction when operating the valve 300 in the reverse direction.

Note that the fine connecting duct 21d that is formed in the first poppet valve 21 fulfills the role of causing the first connecting hole 17b to be blocked quickly by the supply air valve 21b of the first poppet valve 21 by causing the air of the first output air pressure chamber 5 to pass through the through hole 21c that is formed in the first poppet valve 21, to be directed towards the first discharge air duct 10c1 of the spool 10, to flow out into the first discharge air chamber 7-1, and also to be directed into the chamber of the seat retaining portion 18, wherein the first spring 20 is contained, adding an additional biasing force to the first poppet valve 21, when the supply air valve 21b of the first poppet valve 21 is to close the first connecting hole 17b. The fine connecting duct 26d that is formed in the second poppet valve 26 also fulfills the same role.

In this double-action pilot relay, a first discharge air duct 10c1 for connecting the first opening 10a that is located at the first output air pressure chamber 5 to the first discharge air chamber 7-1, and a second discharge air duct 10c2 for connecting the second opening 10b that is located at the second output air pressure chamber 6 to the second discharge air chamber 7-2 may be provided in the spool 10, and the first discharge air duct 10c1 and the second discharge air duct 10c2 may be separated by a non-duct part 10d. In this structure, the spool 10 can be divided either vertically or horizontally by the non-duct part 10d, enabling a method of assembling the spool 10 using an easy method such as screwing, thereby enabling an improvement in productivity.

In this double-action pilot relay, the first output air pressure chamber 5 is adjacent to the discharge air chamber 7-1 with a first diaphragm 9-1 interposed therebetween, and the first discharge air chamber 7-1 is adjacent to the bias chamber 8 with a second diaphragm 9-2 interposed therebetween. Moreover, the input air pressure chamber 2 is adjacent to the bias chamber 8 with a third diaphragm 9-3 interposed therebetween, and the second output air pressure chamber 6 is adjacent to the second discharge air chamber 7-2 with a fifth diaphragm 9-5 interposed therebetween.

As can be understood from the layout of the various chambers, the input air pressure chamber 2 is adjacent to neither the first output air pressure chamber 5 nor the second output air pressure chamber 6, so there is no diaphragm that divides between the input air pressure chamber 2 and the output air pressure chambers 5 and 6. Consequently, there will be no the violent changes between positive and negative pressure on the diaphragms 9-1 through 9-5, enabling an improvement in the durability of the diaphragms.

While in the example in FIG. 1, a bias chamber 8 is provided between the input air pressure chamber 2 and the first discharge air chamber 7-1, the bias chamber 8 may instead be provided between the first output air pressure chamber 5 and the first discharge air chamber 7-1.

Figure 2:
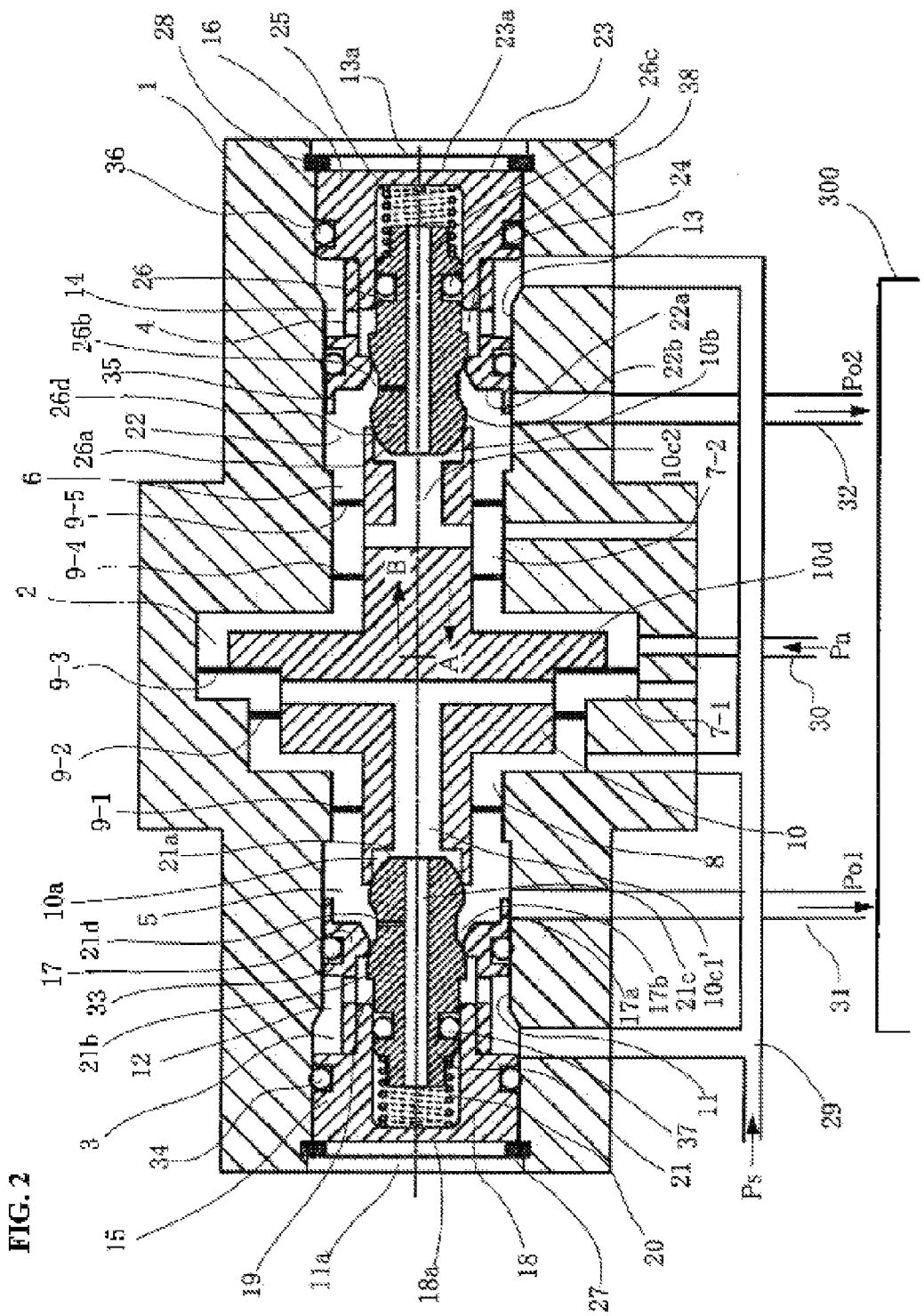
FIG. 2 is a diagram illustrating a structure of another example of a pilot relay (a double-action pilot relay) according to the present invention.
Figure 3:
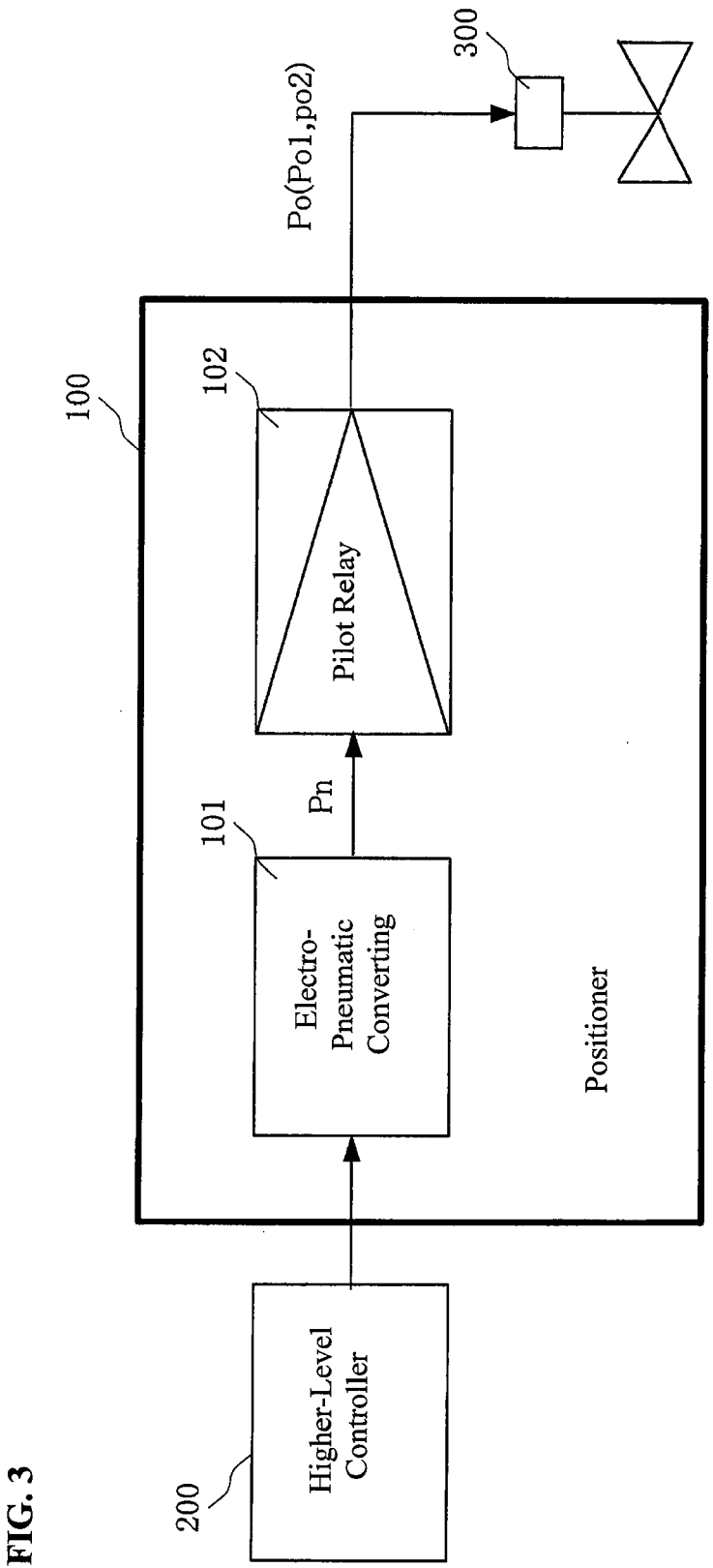
FIG. 3 is a structural diagram illustrating the critical components in a positioner that uses a pilot relay.
Figure 4:
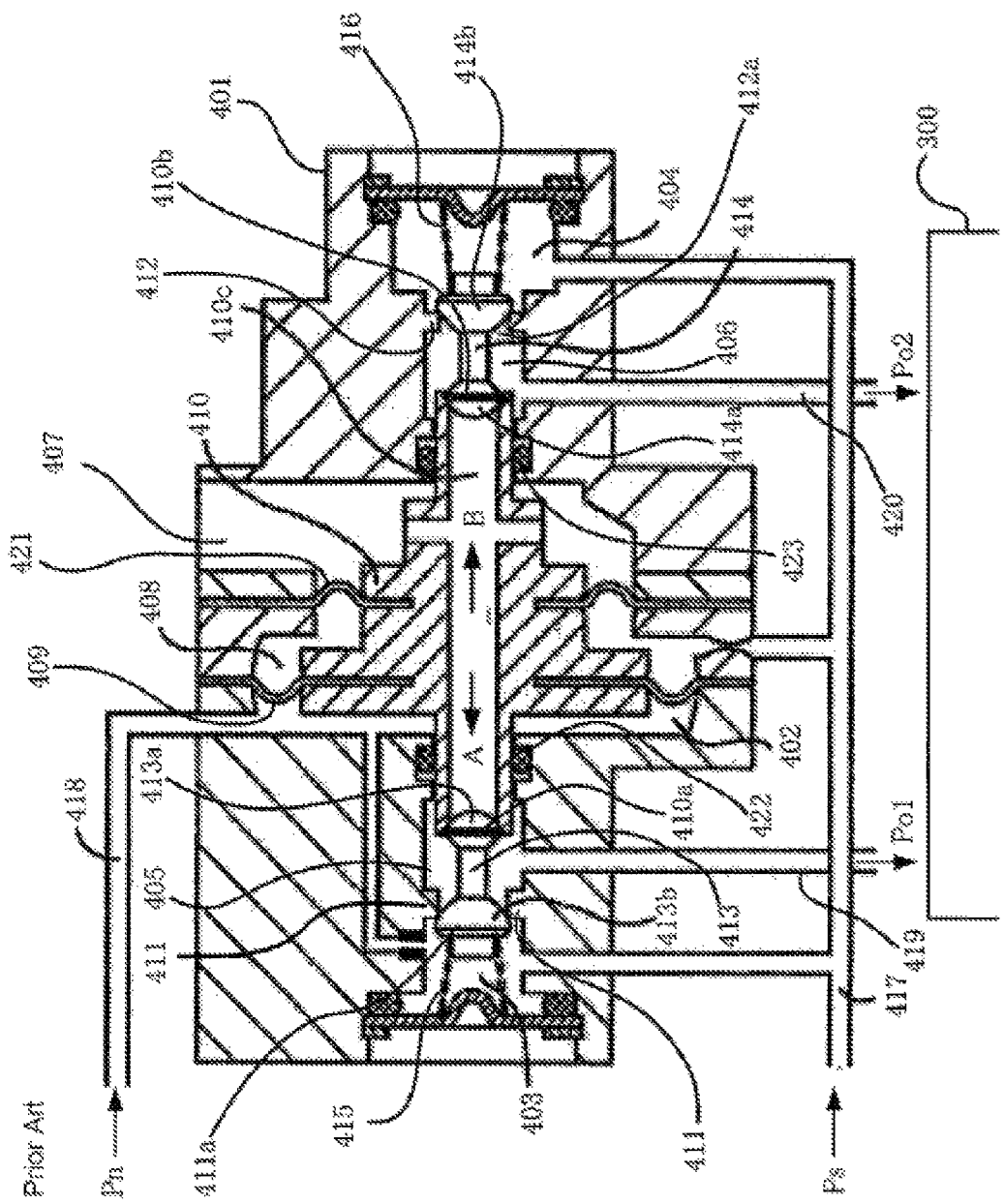
FIG. 4 is a diagram illustrating a structure of the double-action pilot relay disclosed in JP '718.

FIG. 2 shows another example of the provision of the bias chamber 8 between the first output air pressure chamber 5 and the first discharge air chamber 7-1. In this example, the bias chamber 8 is adjacent to the first output air pressure chamber 5, with the first diaphragm 9-1 therebetween, and adjacent to the first discharge air chamber 7-1, with the second diaphragm 9-2 therebetween. Moreover, the input air pressure chamber 2 is adjacent to first discharge air chamber 7-1 with a third diaphragm 9-3 interposed therebetween, and adjacent to the second discharge air chamber 7-2 with a fourth diaphragm 9-4 interposed therebetween. Moreover, the second discharge air chamber 7-2 is adjacent to the second output air pressure chamber 6 with a fifth diaphragm 9-5 interposed therebetween.

In this other example as well, the spool 10 has a first discharge air duct 10c1 that penetrates through the first opening 10a, which is located at the first output air pressure chamber 5, to the first discharge air chamber 7-1, and a second discharge air duct 10c2 that penetrates through the second opening 10b, which is located at the second output air pressure chamber 6, to the second discharge air chamber 7-2, where the first discharge air duct 10c1 and the second discharge air duct 10c2 are separated by a non-duct part 10d.

While in this structure the first discharge air duct 10c1' is open to the first discharge air chamber 7-1 at a central portion of the spool 10, instead, as with the spool 10 in the first form of embodiment, the spool 10 may be divided either vertically or horizontally by the non-duct part 10d, to facilitate easy assembly of the spool 10 through screwing, or the like, to improve productivity.

In this double-action pilot relay, the first output air pressure chamber 5 is adjacent to the bias chamber 8 with a first diaphragm 9-1 interposed therebetween, and the input air pressure chamber 2 is adjacent to the first discharge air chamber 7-1 with a third diaphragm 9-3 interposed therebetween. Moreover, the input air pressure chamber 2 is adjacent to the second discharge air chamber 7-2 with a fourth diaphragm 9-4 interposed therebetween, and the second output air pressure chamber 6 is adjacent to the second discharge air chamber 7-2 with a fifth diaphragm 9-5 interposed therebetween.

As can be understood from the layout of the various chambers, in this example as well, the input air pressure chamber 2 is adjacent to neither the first output air pressure chamber 5 nor the second output air pressure chamber 6, so there is no diaphragm that divides between the input air pressure chamber 2 and the output air pressure chambers 5 and 6. Consequently, there will be no the violent changes between positive and negative pressure on the diaphragms 9-1 through 9-5, enabling an improvement in the durability of the diaphragms.

Moreover, as described above, in the structure set forth in JP '847, the number of chambers required within the casing is increased tremendously, requiring 11 chambers. When the number of chambers is increased, there is an increase in the number of structural components, such as the number of diaphragms, as well, causing the pilot relay to become bulky and leading to problems such as increasing the size and driving up the costs of the positioners that use this technology.

In contrast, in the structures set forth in the examples described above, the chambers that are provided within the casing are only the eight chambers of an input air pressure chamber 2, a first supply air pressure chamber 3, a second supply air pressure chamber 4, a first output air pressure chamber 5, a second output air pressure chamber 6, a first discharge air chamber 7-1, a second discharge air chamber 7-2, and a bias chamber 8, and the number of diaphragms is also low, at only five. Because of this, it is possible to reduce the volume of the pilot relay, to promote miniaturization of the relay as equipped therewith.

Note that while in the examples set forth above a through hole 21c was formed within the first poppet valve 21 and a fine connecting duct 21d was formed for connecting to this through hole 21c, the through hole 21c and the fine connecting duct 21d need not necessarily be formed in this way within the first poppet valve 21. The same is true regarding the second poppet valve 26.

The pilot relay according to the present invention can be used in a positioner, or the like, that controls the degree of opening of a pneumatically actuated regulator valve as a pressure signal amplifying device for amplifying an input air pressure signal.

The invention claimed is:

1. A pilot relay comprising:
an input air pressure chamber, a first supply air pressure chamber, a second supply air pressure chamber, a first output air pressure chamber, a second output air pressure chamber, a first discharge air chamber, a second discharge air chamber, and a bias chamber formed within a housing;
a diaphragm configured to be dislocated by input air pressure directed into the input air pressure chamber;
a moveable body having a first opening located in the first output air pressure chamber, a second opening located in the second output air pressure chamber, a first discharge air duct connecting the first opening to the first discharge air chamber, and a second discharge air duct connecting the second opening to the second discharge air chamber, the movable body being supported by the diaphragm to move within the housing;
a first poppet valve provided to move through a first connecting hole formed in a first dividing wall dividing the first supply air pressure chamber and the first output air pressure chamber, the first poppet valve having, integrally, a first discharge air valve opening and closing a first opening of the moveable body and a first supply air valve opening and closing the first connecting hole;
a second poppet valve provided to move through a second connecting hole formed in a second dividing wall that divides the second supply air pressure chamber and the second output air pressure chamber, the second poppet valve having, integrally, a second discharge air valve opening and closing a second opening of the moveable body and a second supply air valve opening and closing the second connecting hole;
a first spring member biasing the first poppet valve in the direction wherein the first supply air valve closes the first connecting hole; and
a second spring member biasing the second poppet valve in the direction wherein the second supply air valve closes the second connecting hole, wherein:
the input air pressure chamber is provided next to neither the first output air pressure chamber nor the second output air pressure chamber;
the first discharge air chamber is adjacent to the first output air pressure chamber with a first diaphragm interposed therebetween, and adjacent to the bias chamber with a second diaphragm interposed therebetween;
the input air pressure chamber is adjacent to the bias chamber with a third diaphragm interposed therebetween, and adjacent to the second discharge air chamber with a fourth diaphragm interposed therebetween; and
the second discharge air chamber is adjacent to the second output air pressure chamber with a fifth diaphragm interposed therebetween.

2. A pilot relay comprising:
an input air pressure chamber, a first supply air pressure chamber, a second supply air pressure chamber, a first output air pressure chamber, a second output air pressure chamber, a first discharge air chamber, a second discharge air chamber, and a bias chamber formed within a housing;

a diaphragm configured to be dislocated by input air pressure directed into the input air pressure chamber;

a moveable body having a first opening located in the first output air pressure chamber, a second opening located in the second output air pressure chamber, a first discharge air duct connecting the first opening to the first discharge air chamber, a second discharge air duct connecting the second opening to the second discharge air chamber, and the movable body is supported by the diaphragm to move within the housing;

a first poppet valve provided to move through a first connecting hole formed in a first dividing wall dividing the first supply air pressure chamber and the first output air pressure chamber, the first poppet valve having, integrally, a first discharge air valve opening and closing a first opening of the moveable body and a first supply air valve opening and closing the first connecting hole;

a second poppet valve provided to move through a second connecting hole formed in a second dividing wall that divides the second supply air pressure chamber and the second output air pressure chamber, the second poppet valve having, integrally, a second discharge air valve opening and closing a second opening of the moveable body and a second supply air valve opening and closing the second connecting hole;

a first spring member biasing the first poppet valve in the direction wherein the first supply air valve closes the first connecting hole; and a second spring member biasing the second poppet valve in the direction wherein the second supply air valve closes the second connecting hole, wherein:

the input air pressure chamber is provided next to neither the first output air pressure chamber nor the second output air pressure chamber;

the bias chamber is adjacent to the first output air pressure chamber with a first diaphragm interposed therebetween, and adjacent to the first discharge air chamber with a second diaphragm interposed therebetween;

the input air pressure chamber is adjacent to the first discharge air chamber with a third diaphragm interposed therebetween, and adjacent to the second discharge air chamber with a fourth diaphragm interposed therebetween; and the second discharge air chamber is adjacent to the second output air pressure chamber with a fifth diaphragm interposed therebetween.

* * * * *